US012660803B2

(12) United States Patent
Ushinohama et al.

(10) Patent No.: US 12,660,803 B2
(45) Date of Patent: Jun. 23, 2026

(54) FISHING REEL SEAT

(71) Applicant: GLOBERIDE, Inc., Tokyo (JP)

(72) Inventors: Kosuke Ushinohama, Tokyo (JP); Kenji Harada, Tokyo (JP); Hiroshi Jojima, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 72 days.

(21) Appl. No.: 18/234,659

(22) Filed: Aug. 16, 2023

(65) Prior Publication Data

US 2024/0065242 A1 Feb. 29, 2024

(30) Foreign Application Priority Data

Aug. 25, 2022 (JP) ................................. 2022-133885
Feb. 20, 2023 (JP) ................................. 2023-024552

(51) Int. Cl.
*A01K 87/06* (2006.01)

(52) U.S. Cl.
CPC ..................................... *A01K 87/06* (2013.01)

(58) Field of Classification Search
CPC ................................ A01K 87/06; A01K 87/00
USPC ........................................... 43/22, 23, 18.1 R
See application file for complete search history.

(56) References Cited

U.S. PATENT DOCUMENTS

| | | | | |
|---|---|---|---|---|
| 1,980,317 A | * | 11/1934 | Clark | A01K 87/06 |
| | | | | 43/22 |
| 2,104,495 A | * | 1/1938 | O'Brien, Jr. | A01K 87/06 |
| | | | | 43/22 |
| 3,698,118 A | | 10/1972 | Schultz | |
| 4,485,580 A | * | 12/1984 | Ohmura | A01K 87/06 |
| | | | | 43/22 |
| 4,578,890 A | * | 4/1986 | Childre | A01K 87/06 |
| | | | | 43/22 |
| 4,756,114 A | * | 7/1988 | Ohmura | A01K 87/06 |
| | | | | 43/22 |
| 4,839,981 A | * | 6/1989 | Yasui | A01K 87/06 |
| | | | | 43/18.5 |

(Continued)

FOREIGN PATENT DOCUMENTS

| | | |
|---|---|---|
| CN | 214339529 U | 10/2021 |
| JP | S43-004411 B | 2/1968 |

(Continued)

OTHER PUBLICATIONS

Jun. 24, 2024 Office Action Issued in Australian Patent Application No. 2023202972.

(Continued)

*Primary Examiner* — William L Gmoser
(74) *Attorney, Agent, or Firm* — Oliff PLC

(57) ABSTRACT

The present disclosure provides a fishing reel seat for fixing a reel stand of a fishing reel comprising the reel stand and a reel leg in an up-lock manner. The fishing reel seat comprises: a resin reel seat main body that comprises a fixing hood and a hollow portion into which a rod is inserted; a resin floating hood that is movable in an axial direction with respect to the reel seat main body; and an operation knob that moves the floating hood in the axial direction. The fixing hood and the floating hood are configured to cover the reel stand up to the reel leg when the reel stand is inserted into and fixed to the fixing hood and the floating hood.

10 Claims, 9 Drawing Sheets

(56) References Cited

U.S. PATENT DOCUMENTS

| | | | | |
|---|---|---|---|---|
| 4,903,427 | A * | 2/1990 | Yamato | A01K 87/00 |
| | | | | 43/22 |
| 5,600,915 | A * | 2/1997 | Ohmura | A01K 87/06 |
| | | | | 43/22 |
| 5,632,111 | A * | 5/1997 | Takizawa | A01K 87/06 |
| | | | | 43/22 |
| 5,904,000 | A * | 5/1999 | Ohmura | A01K 87/06 |
| | | | | 43/22 |
| 6,378,238 | B1 * | 4/2002 | Lu | A01K 87/06 |
| | | | | 43/18.1 R |
| 6,381,898 | B1 * | 5/2002 | Lee | A01K 87/06 |
| | | | | 43/22 |
| 6,397,511 | B1 * | 6/2002 | Atnip | A01K 87/007 |
| | | | | 43/22 |
| 6,871,441 | B1 * | 3/2005 | Tsurufuji | A01K 87/06 |
| | | | | 43/22 |
| 9,814,224 | B2 * | 11/2017 | Doucet | A01K 87/007 |
| 2016/0198689 | A1 * | 7/2016 | Omura | A01K 89/01127 |
| | | | | 43/22 |

FOREIGN PATENT DOCUMENTS

| | | | |
|---|---|---|---|
| JP | 2000-287587 | A | 10/2000 |
| JP | 2000270722 | A | 10/2000 |
| JP | 2014-18088 | A | 2/2014 |
| JP | 2015-167508 | A | 9/2015 |
| JP | 2019-140939 | A | 8/2019 |
| JP | 2022-100614 | A | 7/2022 |

OTHER PUBLICATIONS

Aug. 28, 2025 Office Action issued in Singaporean Patent Application No. 10202301524X.

Jul. 12, 2025 Office Action issued in Chinese Patent Application No. 202310501674.9.

Dec. 16, 2025 Office Action issued in Japanese Patent Application No. 2023-024552.

Jan. 26, 2026 Office Action issued in Chinese Patent Application No. 202310501674.9.

Mar. 27, 2026 Office Action issued in Chinese Patent Application No. 202310501674.9.

* cited by examiner

FISHING REEL SEAT

CROSS-REFERENCE TO RELATED APPLICATION

This application claims priority under 35 U.S.C. § 119 to Japanese Patent Application No. 2022-133885 filed on Aug. 25, 2022 and Japanese Patent Application No. 2023-024552 filed on Feb. 20, 2023 in the Japanese Patent Office, the entire contents of each hereby incorporated by reference.

FIELD

The present disclosure relates to a fishing reel seat.

BACKGROUND

A fishing reel seat disclosed in JP 2000-270722 A below is extremely general conventional technology, and includes a reel seat main body having a fixing hood, a floating hood (moving hood) movable in an axial direction with respect to the reel seat main body, and an operation knob that moves the floating hood. A fishing reel includes a reel stand in contact with the reel seat along the axial direction, and a reel leg rising from the reel stand, and the fishing reel can be attached to and detached from a fishing rod by clamping the reel stand by the fixing hood and the floating hood or releasing the reel stand.

SUMMARY

In the conventional fishing reel seat described above, only a tip and a rear end (a length is about 10 mm or less) of the reel stand are inserted and fixed by the fixing hood and the moving hood, and when the fishing reel is fixed to the fishing rod, about half of the reel stand is exposed.

For this reason, user's hands and fingers come in direct contact with the exposed reel stand. However, since the reel stand and the reel leg are mostly made of a metal, there is a problem that a load on the user's hands and fingers increases due to long-time actual fishing.

In particular, when a large target is aimed at with a lure, both the fishing rod and the reel become large, and a lure action also becomes large. Therefore, if the hands and the fingers continue to come in contact with the metal reel stand, a burden on the user becomes very large. In addition, in fishing in winter, the metal reel stand is lowered in temperature, and the hands and the fingers that come into contact with the metal reel stand are cooled, so that there is also a problem that the burden on the user increases.

The present disclosure has been made to solve the above problems, and an object thereof is to provide a fishing reel seat capable of preventing user's hands and fingers from coming into contact with a reel stand and reducing a burden on a user.

In order to achieve the above object, the present disclosure provides a fishing reel seat for fixing a reel stand of a fishing reel comprising the reel stand and a reel leg in an up-lock manner. The fishing reel seat comprises: a cylindrical resin reel seat main body that comprises a fixing hood and a hollow portion into which a rod is inserted; a resin floating hood that is movable in an axial direction with respect to the reel seat main body; and an operation knob that is continuous with the floating hood and rotates in a circumferential direction to move the floating hood in the axial direction. The fixing hood and the floating hood are configured to cover the reel stand up to the reel leg when the reel stand is inserted into and fixed to the fixing hood and the floating hood.

In one embodiment, a front end of the floating hood protrudes toward the reel leg, and a front end face of the floating hood is inclined forward as the front end face goes downward in side view.

In one embodiment, an outer peripheral surface of the floating hood on the side of an upper portion and an outer peripheral surface of the reel seat main body on the side of an upper portion are flush with each other.

In one embodiment, the operation knob has a female screw formed on an inner surface thereof and is rotatable in a circumferential direction by screwing with a male screw formed in the reel seat main body, and an axial length of a screwing portion in which the male screw and the female screw are engaged is less than half of a sum of axial lengths of the floating hood and the operation knob.

In one embodiment, an insertion depth of the reel stand in each of the fixing hood and the floating hood is 25 to 35 mm.

According to the fishing reel seat of the present disclosure described above, when the reel stand is inserted into and fixed to the fixing hood and the floating hood, the fixing hood and the floating hood are configured to cover the reel stand up to the reel leg, that is, the reel stand is configured to be substantially covered by the fixing hood and the floating hood and not to be exposed. Therefore, user's hands and fingers do not come into direct contact with the reel stand, and a burden on a user for use for a long time can be reduced.

DETAILED DESCRIPTION

Figure 1:
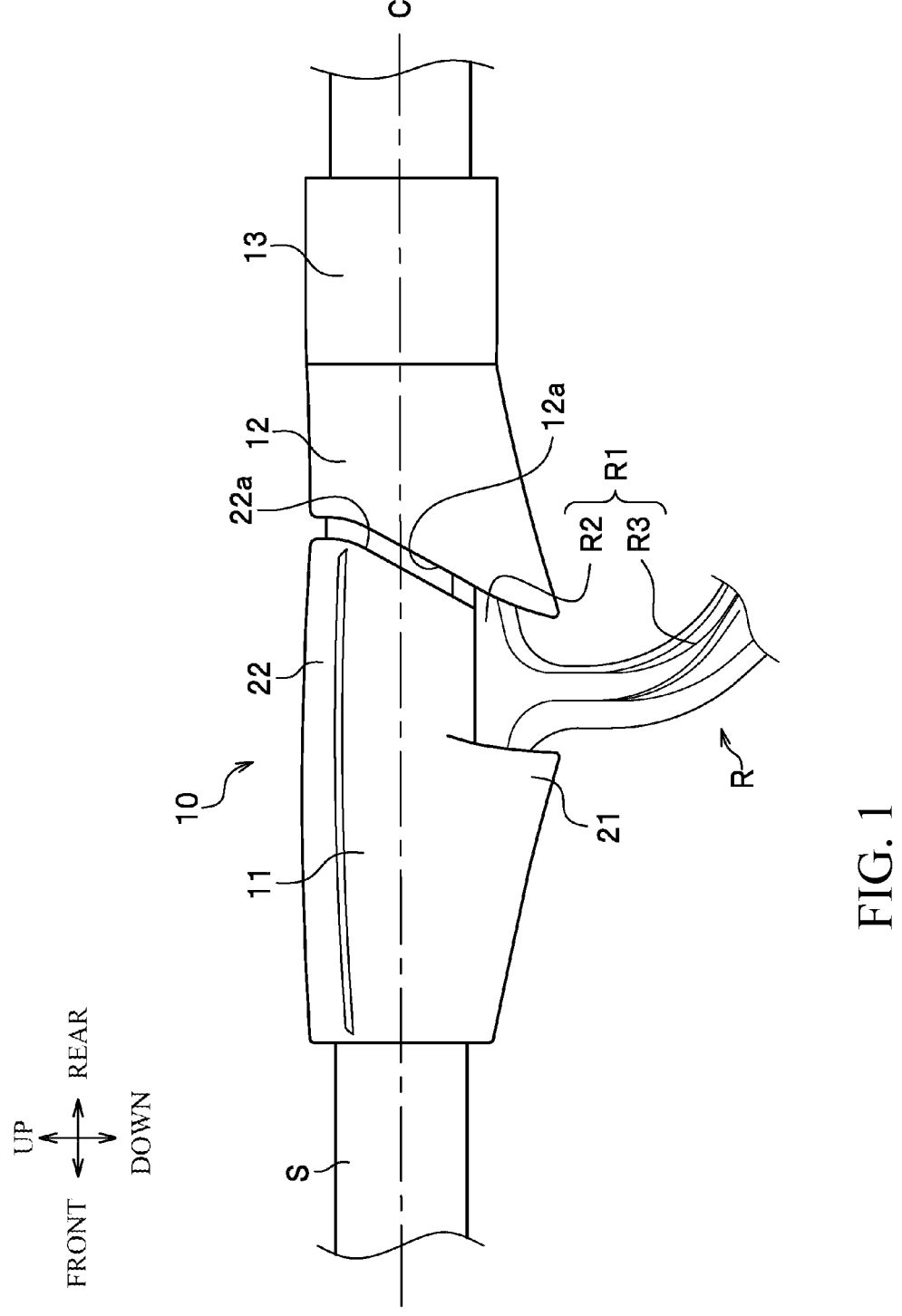
FIG. 1 is a side view illustrating a structure of a fishing reel seat according to an embodiment of the present disclosure.

Hereinafter, a structure of a fishing reel seat according to an embodiment of the present disclosure will be described with reference to the drawings. In the embodiment, the same portions are denoted by the same reference numerals, and redundant description will be omitted. Note that "up and down", "left and right", and "front and rear" follow arrows in FIGS. 1 and 2. A rod tip side is "front", and a rod base side is "rear".

As illustrated in FIG. 1, a fishing reel seat 10 (hereinafter, referred to as the reel seat 10) according to the present embodiment fixes a reel attachment portion R1 of a fishing reel R, and the reel attachment portion R1 comprises a reel stand R2 and a reel leg R3 extending from the reel stand R2. The reel leg R3 extends substantially perpendicularly to the reel stand R2. There are various fishing reels having various sizes, but a general (standard) length of the reel stand R2 in a front-rear direction is 60 to 80 mm. The reel seat 10 according to the present embodiment is assumed to be used for fixing the fishing reel R having the standard length of 60 to 80 mm of the reel stand R2 described above.

The reel seat 10 comprises a reel seat main body 11 comprising a fixing hood 21, a floating hood 12, and an operation knob 13. The reel seat 10 is provided with the floating hood 12 on the rear side of the reel seat main body 11, and is of an up-lock type in which the floating hood 12 is moved forward to fasten and fix the reel stand R2 with the fixing hood 21. As illustrated in FIG. 1, when the reel stand R2 is fixed by the fixing hood 21 and the floating hood 12, the fixing hood 21 and the floating hood 12 are configured to substantially cover the reel stand R2 up to the reel leg R3. That is, the reel stand R2 is configured to be substantially covered by the fixing hood 21 and the floating hood 12 so as not to be exposed.

Figure 2:
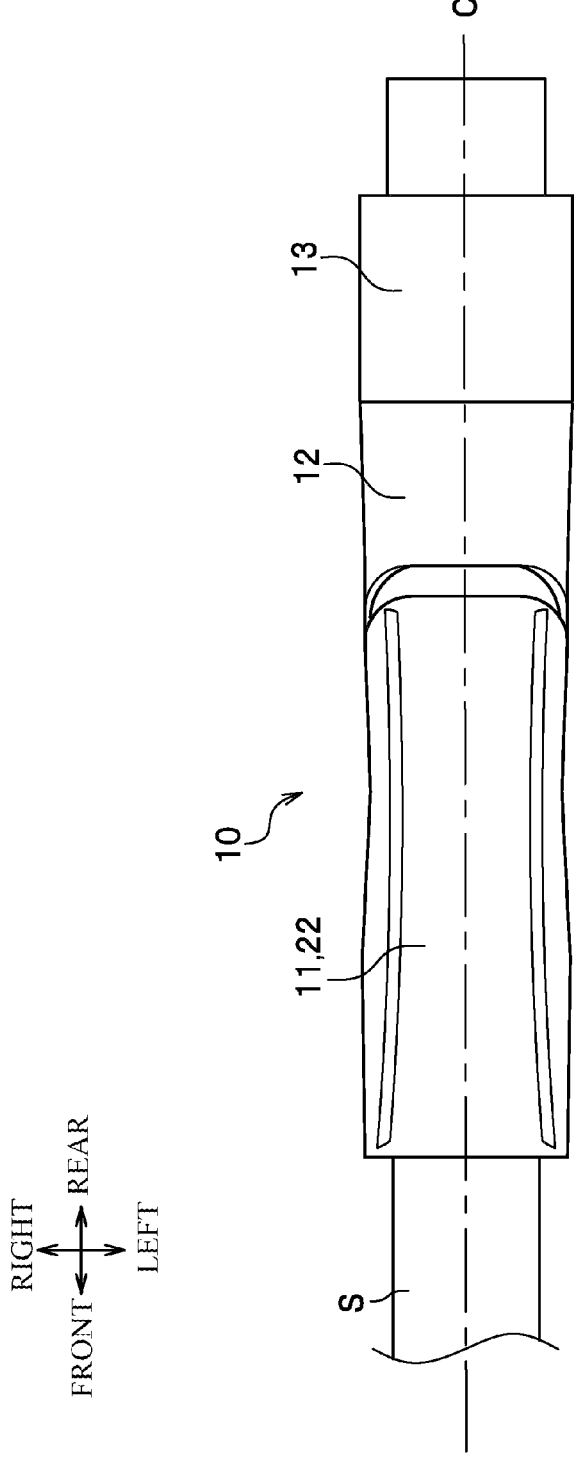
FIG. 2 is a top view illustrating the fishing reel seat according to the present embodiment.
Figure 3:
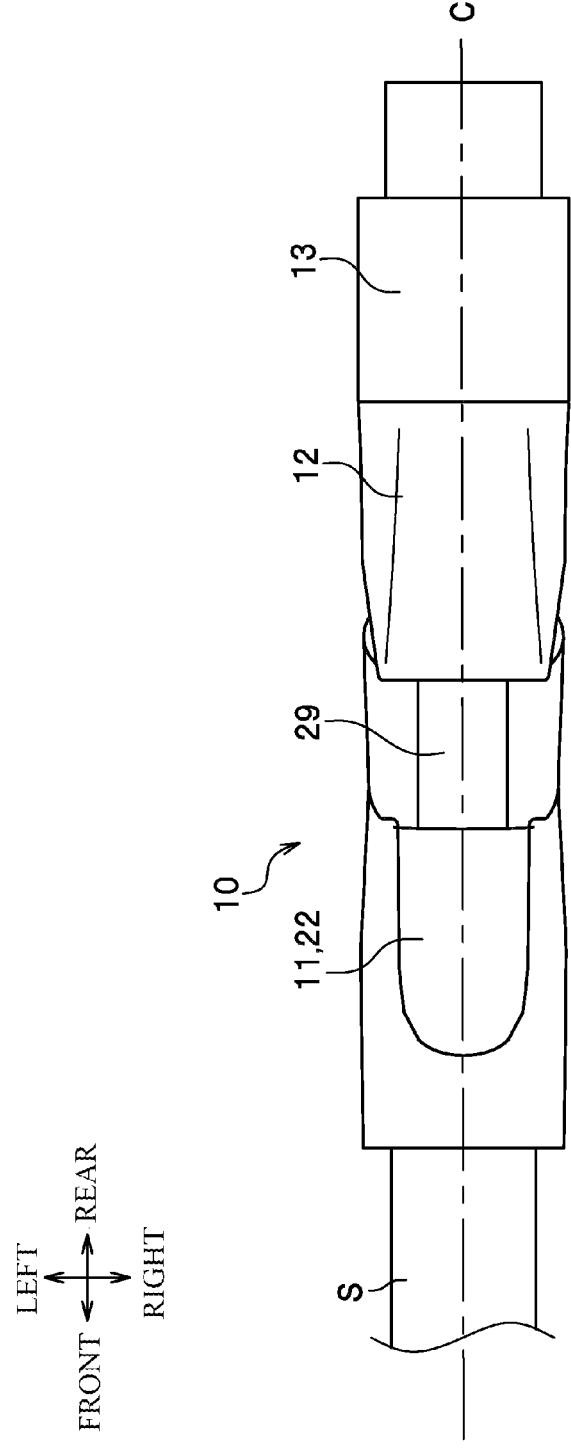
FIG. 3 is a bottom view illustrating the fishing reel seat according to the present embodiment.

FIG. 2 is a top view of the reel seat 10 according to the present embodiment, and FIG. 3 is a bottom view of the reel seat 10.

Figure 4:
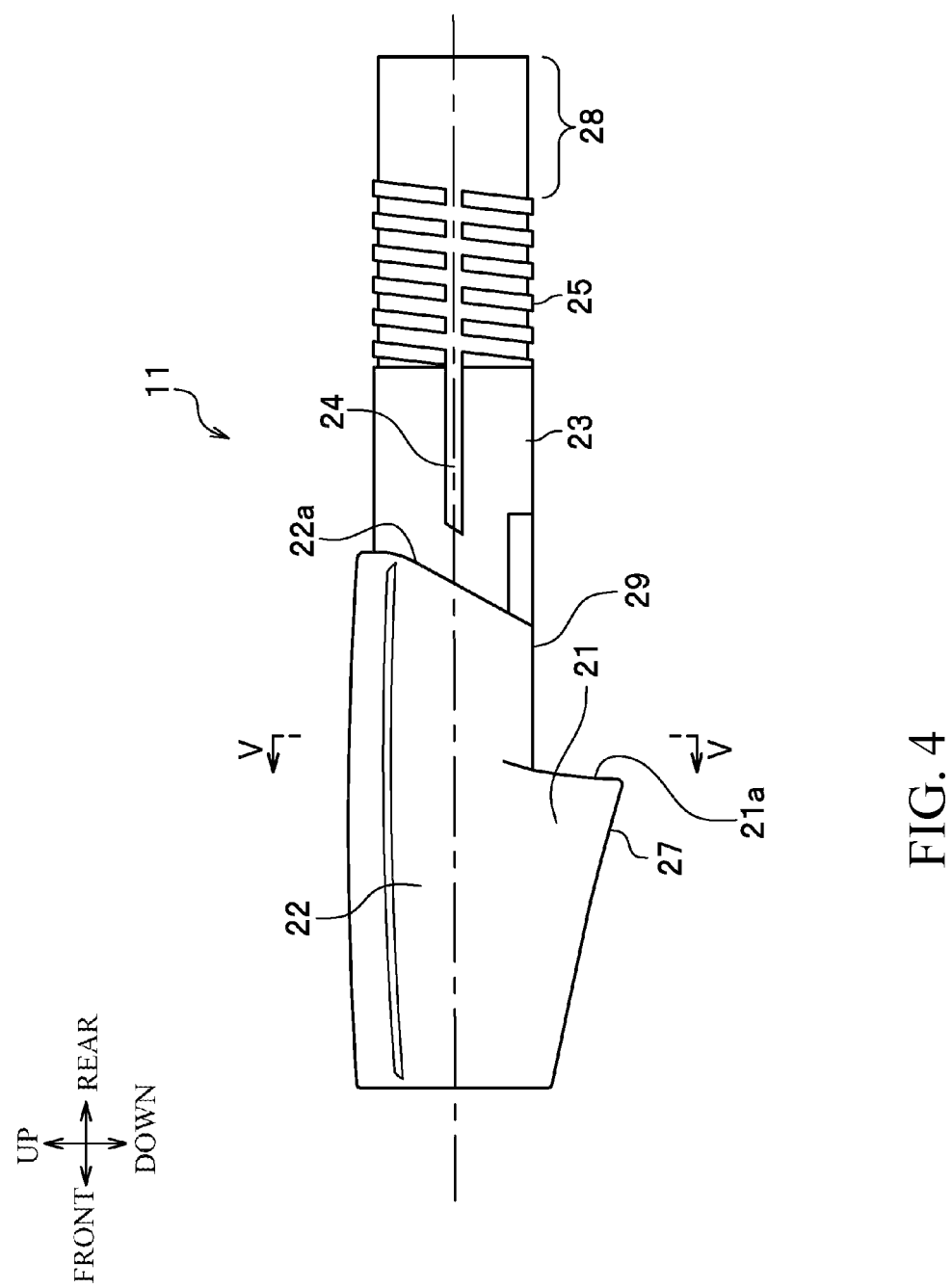
FIG. 4 is a side view illustrating a reel seat main body according to the present embodiment.
Figure 5:
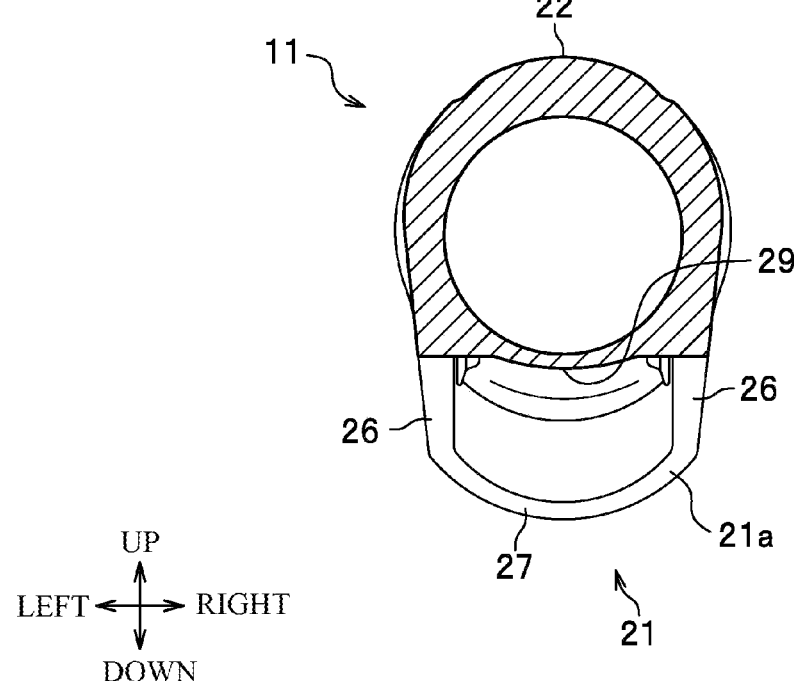
FIG. 5 is a cross-sectional view taken along the line V-V of FIG. 4.

FIGS. 4 and 5 are views illustrating the reel seat main body 11, and the reel seat main body 11 is a cylindrical resin member comprising a fixing hood 21 on the front side and a hollow portion into which a rod S is inserted. The reel seat main body 11 comprises the fixing hood 21, a front grip portion 22, a middle cylindrical portion 23, a guide groove 24, and a male screw 25. A mounting seat 29 on which the reel stand R2 is placed is formed below the reel seat main body 11 along an axial direction.

The fixing hood 21 is a portion into which a front portion of the reel stand R2 is inserted. The fixing hood 21 bulges downward from the front grip portion 22 and is opened rearward. The hollow portion of the fixing hood 21 gradually narrows toward the front side. As illustrated in FIG. 5, the fixing hood 21 comprises side walls 26 and 26 and a lower wall 27. The side walls 26 and 26 extend downward from the front grip portion 22 while facing each other. The lower wall 27 connects lower ends of the side walls 26 and 26 and is curved so as to be convex downward. As illustrated in FIG. 4, the lower wall 27 is inclined downward toward the rear. A rear end face 21a of the fixing hood 21 is perpendicular or substantially perpendicular to the mounting seat 29. A depth of the fixing hood 21 at which the front portion of the reel stand R2 is inserted is set to 25 to 35 mm so as to cover almost the entire front portion of the reel stand R2.

As illustrated in FIG. 4, the front grip portion 22 has a substantially cylindrical shape, and an outer peripheral surface thereof is a portion to which a palm of a user is put. The front grip portion 22 has an outer diameter larger than that of the middle cylindrical portion 23. The front grip portion 22 is formed from a center portion to a front end of the reel seat main body 11. A rear end face 22a of the front grip portion 22 is inclined forward as the rear end face goes downward in side view.

The guide groove 24 extends along the front-rear direction (axial direction) on both side portions and an upper portion of the middle cylindrical portion 23. The guide groove 24 is a portion with which a guide protrusion 33 of the floating hood 12 described later is engaged. The male screw 25 is formed on an outer peripheral surface of a rear portion of the middle cylindrical portion 23. Note that the guide groove 24 also extends along the axial direction in the male screw 25. A smoothing portion 28 in which the male screw 25 is not formed is formed at the rear end of the middle cylindrical portion 23.

Figure 6:
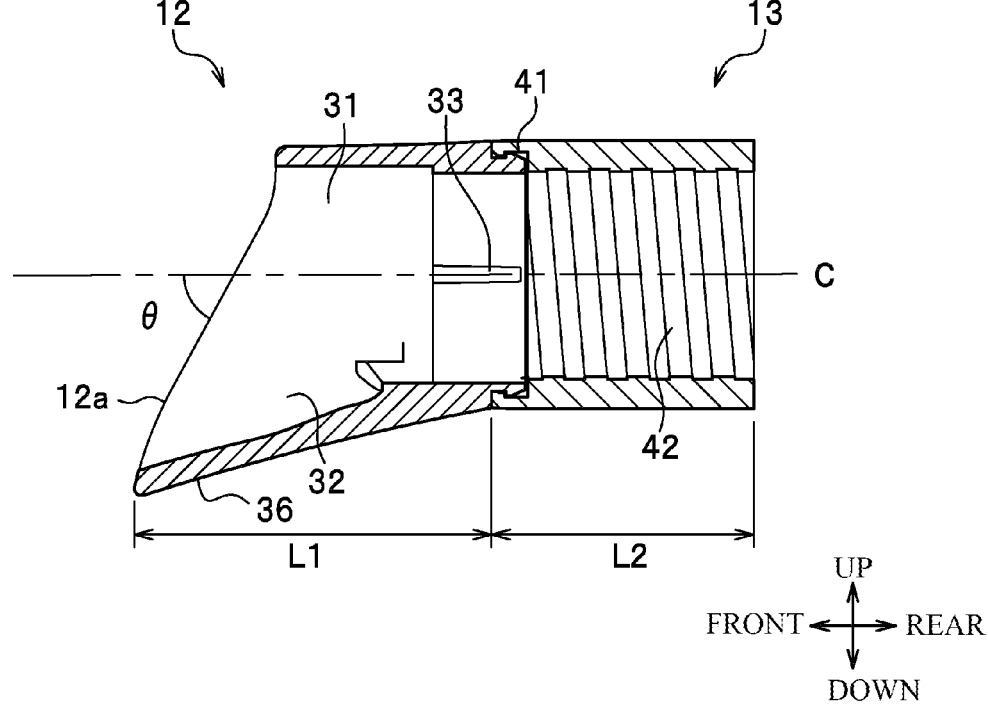
FIG. 6 is a cross-sectional view illustrating a floating hood and an operation knob.
Figure 7:
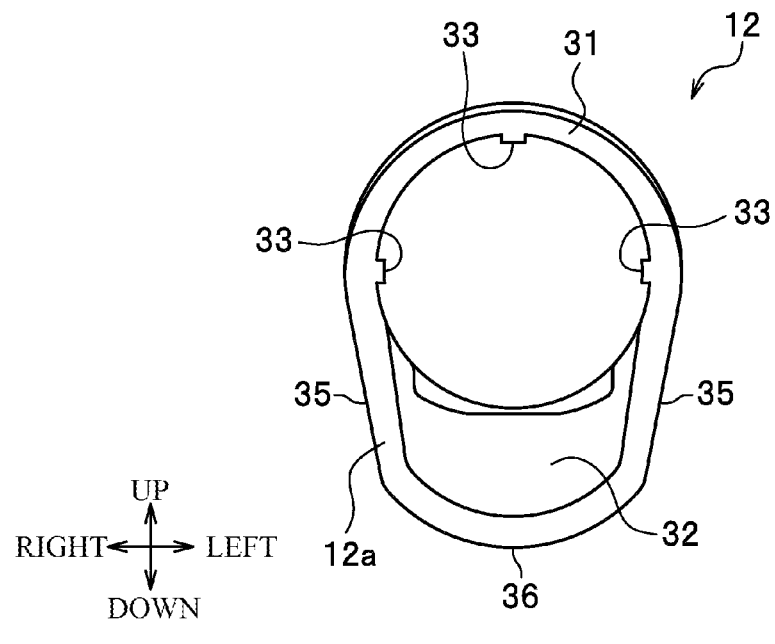
FIG. 7 is a view of the floating hood as viewed from the front.

FIGS. 6 and 7 are views illustrating the floating hood and the operation knob. The floating hood 12 is a cylindrical member comprising a hollow portion and made of a resin, and comprises an upper portion 31, a lower portion 32, and a plurality of guide protrusions 33. The floating hood 12 is externally mounted on the middle cylindrical portion 23 and is movable in the front-rear direction. The rear portion of the reel stand R2 can be sandwiched between the floating hood 12 and the mounting seat 29 of the reel seat main body 11. A depth of the floating hood 12 at which the rear portion of the reel stand R2 is inserted is set to 25 to 35 mm so as to cover almost the entire rear portion of the reel stand R2.

The upper portion 31 is a semicircular portion. The outer peripheral surface of the upper portion 31 has substantially the same shape as the outer peripheral surface of the front grip portion 22, and is flush with the outer peripheral surface of the front grip portion 22 in a circumferential direction. The lower portion 32 comprises side walls 35 and 35 and a lower wall 36. Each of the side walls 35 and 35 is continuous from the lower end of the upper portion 31 and extends downward. The side walls 35 and 35 are flat plate-shaped portions, and are inclined in a direction where the side walls approach each other downward. The lower wall 36 connects lower ends of the side walls 35 and 35 and is curved so as to be convex downward. As illustrated in FIG. 6, the lower wall 36 is inclined downward toward the front. That is, the hollow portion formed by the floating hood 12 and the mounting seat 29 gradually narrows toward the rear. A front end face 12a of the floating hood 12 is inclined forward as the front end face goes downward in side view. That is, an angle θ formed by an axis C and the end face 12a is 30 to 60°, preferably 40 to 50°.

The guide protrusion 33 is a ridge that extends in the front-rear direction and is engaged with the guide groove 24 (see FIG. 4). As illustrated in FIG. 7, the guide protrusion 33 is formed at a position corresponding to the guide groove 24 in the upper portion and both the side portions. The positions and the number of guide grooves 24 and guide protrusions 33 may be appropriately set.

As illustrated in FIG. 6, the operation knob 13 is a cylindrical member connected to the rear portion of the floating hood 12, and may be made of a resin or metal. The operation knob 13 is connected to the floating hood 12 via an engaging portion 41 and is rotatable in the circumferential direction. A female screw 42 is formed on an entire inner peripheral surface of the operation knob 13 in the axial direction. An outer peripheral surface of a front end of the operation knob 13 and an outer peripheral surface of the rear end of the floating hood 12 have substantially the same diameter. Note that the operation knob 13 may be provided with a protrusion on the outer peripheral surface, a decorative ring, or the like.

Figure 8:
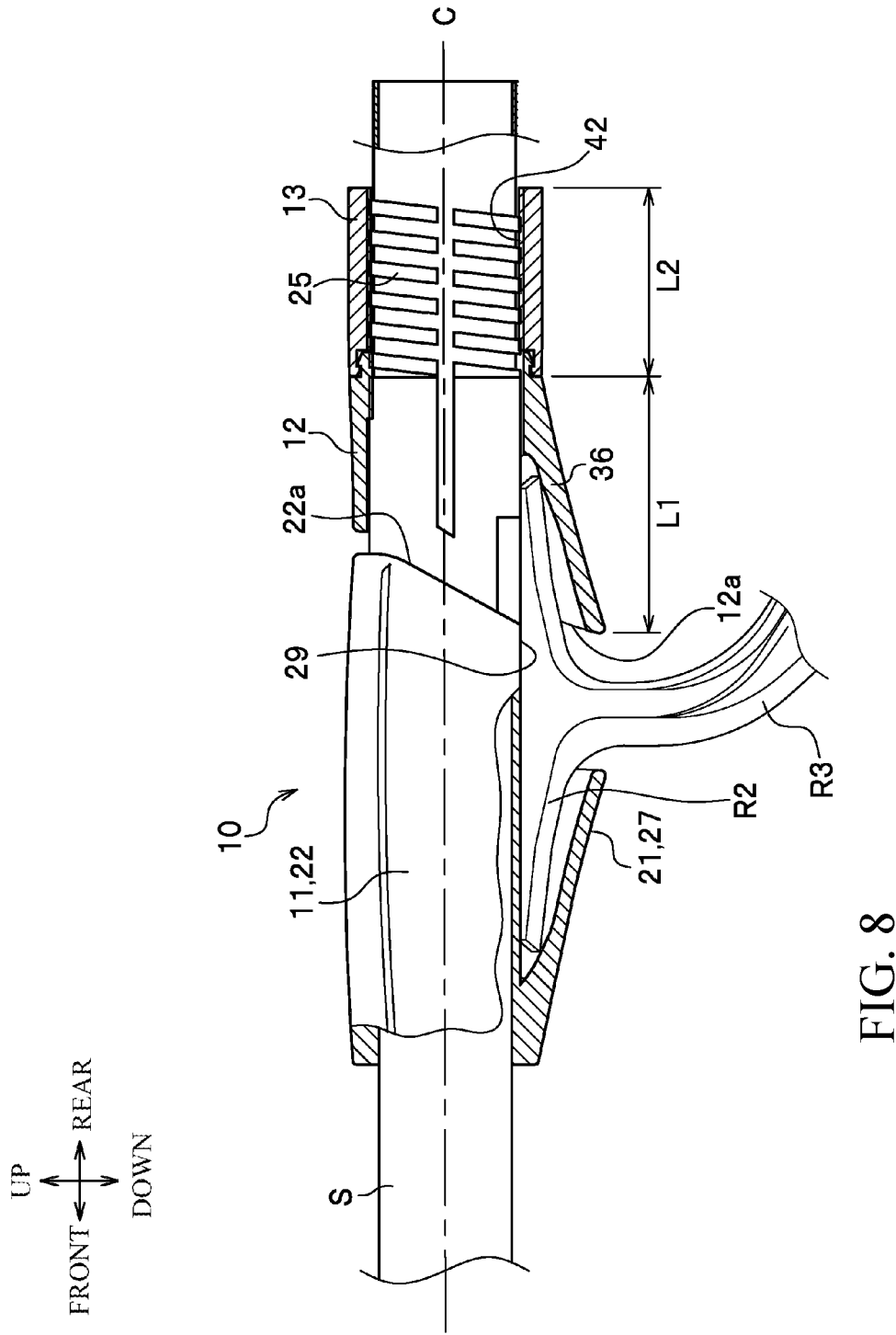
FIG. 8 is a cross-sectional view illustrating a structure of the fishing reel seat according to the present embodiment.

As illustrated in FIG. 8, the reel seat main body 11 is provided with the male screw 25 to be screwed into the female screw 42 formed on an inner surface of the floating hood 12, and an axial length of the male screw 25 and an axial length of the female screw 42 are substantially the same. An axial length of a screwing portion where the male screw 25 and the female screw 42 are engaged with each other is less than half of a sum of an axial length L1 of the floating hood 12 and an axial length L2 of the operation knob 13.

Next, an operation of fixing the fishing reel R to the reel seat 10 according to the present embodiment will be described. As illustrated in FIG. 8, the reel stand R2 is placed on the mounting seat 29 along the axial direction while the front end of the reel stand R2 is inserted into the fixing hood 21. Then, the operation knob 13 is rotated in a clockwise direction to move the floating hood 12 forward, and the reel stand R2 is clamped and fixed by the mounting seat 29, the fixing hood 21, and the floating hood 12.

Figure 9:
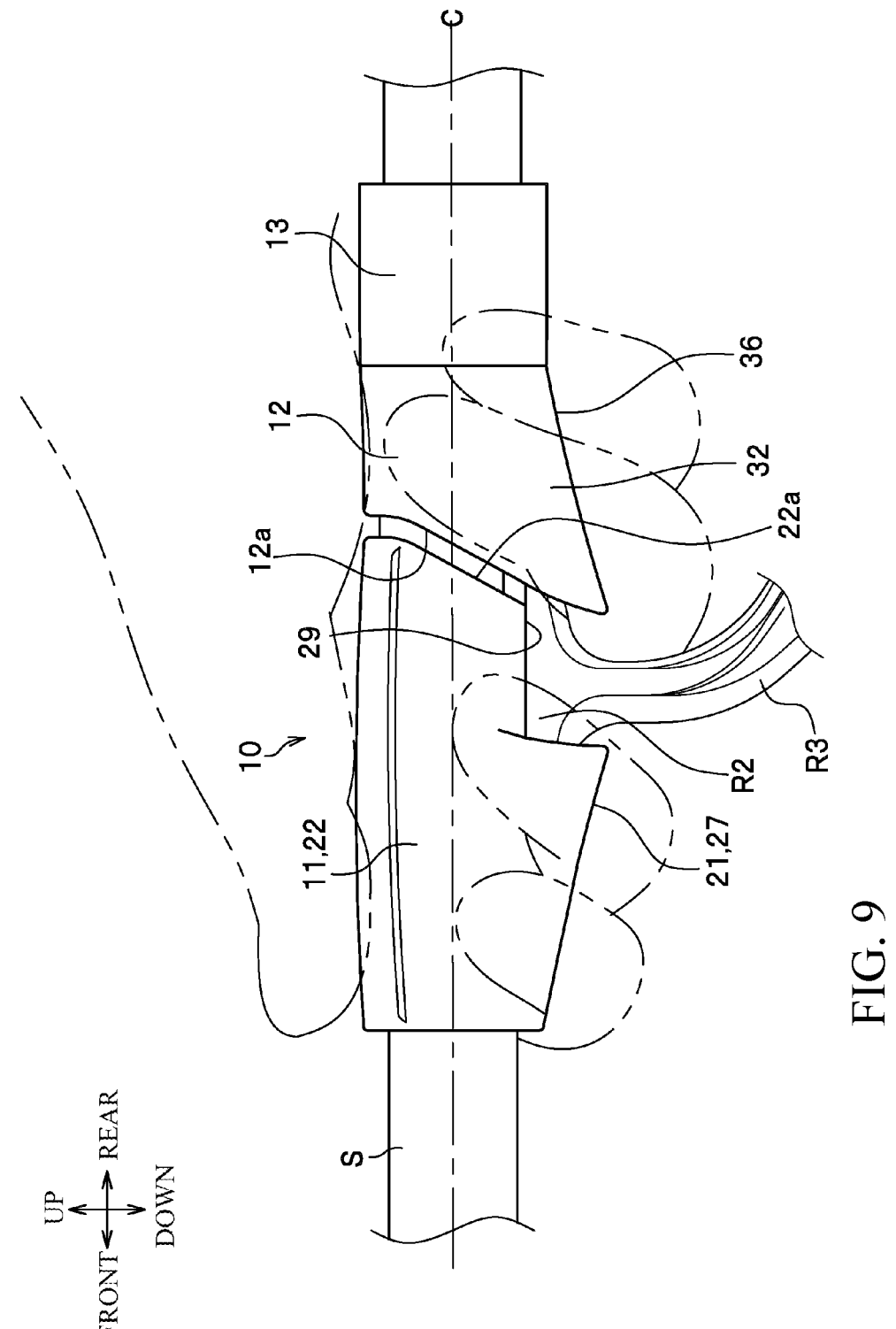
FIG. 9 is a side view illustrating a state in which a user grips the fishing reel seat according to the present embodiment.

As illustrated in FIG. 9, even when the operation knob 13 is fully tightened, it is preferable that the front grip portion 22 and the floating hood 12 do not come into contact with each other and face each other with a slight gap. That is, the end face 22a of the front grip portion 22 and the end face 12a of the floating hood 12 are inclined forward as the end faces go downward and are opposed parallel to each other with a gap. As a result, buckling of the reel seat main body 11 and the floating hood 12 due to excessive tightening of the floating hood 12 can be prevented.

On the other hand, by rotating the operation knob 13 in a counterclockwise direction opposite to the above direction, the floating hood 12 can be moved backward, and the reel stand R2 can be removed from the fixing hood 21.

FIG. 9 is a side view illustrating a state in which the user grips the reel seat 10, in a state in which the fishing reel R is fixed to the reel seat 10 according to the present embodiment. Generally, the user puts an index finger and a middle finger on the lower portion of the fixing hood 21, puts a ball of a thumb on the upper portion of the front grip portion 22, and puts a ring finger along the outer peripheral surface of the lower portion 32 of the floating hood 12 to perform gripping. That is, the reel leg R3 is clamped by the middle finger and the ring finger, and a little finger is put along the vicinity of the boundary between the floating hood 12 and the operation knob 13 while continuing to the ring finger. Note that this gripping method is merely an example, and gripping may be performed by another gripping method.

As illustrated in FIG. 9, since the reel stand R2 is substantially covered and not exposed up to the reel leg R3 by the fixing hood 21 and the floating hood 12, the user's hands and fingers do not come into contact with the reel stand R2 in a state in which the user grips the reel seat 10. More specifically, the fixing hood 21 entirely covers the front side of the reel stand R2, and the front end of the floating hood 12 protrudes toward the reel leg R3 and entirely covers the rear side of the reel stand R2. As a result, the reel stand R2 can be entirely covered with the fixing hood 21 made of a resin and the floating hood 12 made of a resin, and both the gap between the fixing hood 21 and the reel leg R3 and the gap between the floating hood 12 and the reel leg R3 can be reduced.

Further, since the reel seat 10 is made of a resin, the heat of the reel stand R2 is less likely to be transferred to the user's hands and fingers, and the weight can be reduced.

In the present embodiment, the lower portion 32 of the front side of the floating hood 12 protrudes toward the reel leg R3, and the end face 12a of the front side of the floating hood 12 is inclined forward as the end face goes downward in side view. As a result, the reel stand R2 can be reliably covered, and the gap between the reel leg R3 and the floating hood 12 can be further reduced, so that a gripping property can be improved. As illustrated in FIG. 9, since the end face 12a of the floating hood 12 is inclined, the finger (ring finger) is placed along the lower portion 32 of the floating hood 12 while the finger (ring finger) is placed along the inclination. In other words, the finger (ring finger) does not come into contact with the front grip portion 22 when gripping is performed. As a result, the stability of the finger is improved, and the gripping property can be further improved.

As in the present embodiment, the outer peripheral surface of the floating hood 12 on the side of the upper portion 31 and the outer peripheral surface of the reel seat main body 11 on the side of the upper portion (front grip portion 22) are preferably flush with each other. As a result, a step (step in a radially outward direction) between the floating hood 12 and the reel seat main body 11 can be eliminated, so that the gripping property can be improved.

As in the present embodiment, the axial length of the screwing portion is preferably less than half of the sum of the axial lengths of the floating hood 12 and the operation knob 13. As a result, the floating hood 12 can be quickly released with respect to the reel seat main body 11 while reliably fixing the fishing reel R, so that the detachability of the fishing reel R can be improved. In the present embodiment, the front end face 12a of the floating hood 12 is inclined forward as the front end face goes downward. Accordingly, when the floating hood 12 is detached from the male screw 25, the floating hood 12 can be rotated in the circumferential direction, so that the reel stand R2 can be quickly removed.

The axial length L1 of the floating hood 12 is set to be larger than the axial length L2 of the operation knob 13. As a result, for example, in a case where the reel leg R3 is clamped and gripped by the middle finger and the ring finger, the finger is hardly hooked on the operation knob 13. Accordingly, it is possible to prevent the fishing reel R from loosening due to rotation of the operation knob 13 caused by touching of the finger during actual fishing.

The reel seat 10 according to the present disclosure is assumed to be used for a fishing reel having the standard length of 60 to 80 mm in the front-rear direction of the reel stand R2, and the depths of the fixing hood 21 and the floating hood 12 at which the reel stand is inserted are set to 25 to 35 mm, so that the reel stand R2 is not exposed with the front-rear portion up to the reel leg R3 being substantially covered by the fixing hood 21 and the floating hood 12. Note that, when the reel seat 10 according to the present disclosure is used for a special fishing reel having a length outside the range of 60 to 80 mm in the front-rear direction of the reel stand R2, the depths of the fixing hood 21 and the floating hood 12 at which the reel stand is inserted may be changed to appropriate depths.

REFERENCE SIGNS LIST

10 Reel seat
11 Reel seat main body
12 Floating hood
12a End face
13 Operation nob
R Fishing reel
R1 Reel attachment portion
R2 Reel stand
R3 Reel leg

What is claimed is:
1. A fishing reel seat that is configured to fix a reel stand of a fishing reel comprising the reel stand and a reel leg in an up-lock manner, the fishing reel seat comprising:
    a cylindrical resin reel seat main body that comprises a fixing hood that is configured to receive a part of the reel stand and a hollow portion into which a rod is inserted;

a resin floating hood that that is configured to receive another part of the reel stand and is movable in an axial direction with respect to the reel seat main body; and an operation knob that is continuous with the floating hood and is able to fix the reel stand when the operating knob is rotated in a circumferential direction to move the floating hood in the axial direction toward the tip of the rod, wherein the floating hood has a front end face that faces the reel seat main body and is angled so that the front end face protrudes farther in the axial direction toward the rod tip as the front end face extends from an upper portion of the front end face, which is located on an opposite side of the floating hood, toward a lowest portion of the front end face, which is configured to extend beyond the reel leg when the reel stand is inserted into and fixed to the floating hood and the fixing hood, such that the lowest portion of the front end face protrudes farther in the axial direction toward the rod tip than any other portion of the front end face, and an axial length of the floating hood is larger than an axial length of the operation knob.

2. The fishing reel seat according to claim 1, wherein an outer peripheral surface of the floating hood on the side of the upper portion and an outer peripheral surface of the reel seat main body on the side of an upper portion are flush with each other.

3. The fishing reel seat according to claim 1, wherein the operation knob has a female screw formed on an inner surface thereof and is rotatable in a circumferential direction by screwing with a male screw formed in the reel seat main body, and an axial length of a screwing portion in which the male screw and the female screw are engaged is less than half of a sum of axial lengths of the floating hood and the operation knob.

4. The fishing reel seat according to claim 1, wherein an insertion depth of the reel stand in each of the fixing hood and the floating hood is 25 to 35 mm.

5. The fishing reel seat according to claim 1, wherein the front end face and a center longitudinal axis of the floating hood form an angle, and wherein the angle has a value in a range of from 30° to 60°.

6. The fishing reel seat according to claim 1, wherein the front end face and a center longitudinal axis of the floating hood form an angle, and wherein the angle has a value in a range of from 40° to 50°.

7. The fishing reel seat according to claim 1, wherein the cylindrical resin reel seat main body includes a rear end face that faces the floating hood and is angled so that an upper portion of the rear end face, which is configured to be farthest from the reel leg when the reel stand is inserted into and fixed to the floating hood and the fixing hood, protrudes in the axial direction farther toward the base of the rod than a lower portion of the rear end face that is located on an opposite side of the cylindrical resin main body.

8. A fishing rod combination that includes (i) the fishing reel seat according to claim 1; (ii) the rod, which is inserted into the cylindrical resin reel seat main body; and (iii) the fishing reel.

9. The fishing rod combination according to claim 8, wherein the fixing hood and the floating hood are configured to cover the reel stand up to the reel leg when the reel stand is inserted into and fixed to the fixing hood and the floating hood.

10. The fishing rod combination according to claim 8, wherein the fishing reel is a spinning reel.

* * * * *